(12) United States Patent
Robertson, III

(10) Patent No.: US 9,099,231 B2
(45) Date of Patent: Aug. 4, 2015

(54) PRESSURE RETAINING SLEEVE

(75) Inventor: Walter Dennis Robertson, III, Harleysville, PA (US)

(73) Assignee: BROOKS INSTRUMENT, LLC, Hatfield, PA (US)

( * ) Notice: Subject to any disclaimer, the term of this patent is extended or adjusted under 35 U.S.C. 154(b) by 585 days.

(21) Appl. No.: 12/739,379

(22) PCT Filed: Oct. 23, 2007

(86) PCT No.: PCT/US2007/082258
§ 371 (c)(1),
(2), (4) Date: Jun. 17, 2010

(87) PCT Pub. No.: WO2009/054848
PCT Pub. Date: Apr. 30, 2009

(65) Prior Publication Data
US 2010/0252761 A1  Oct. 7, 2010

(51) Int. Cl.
*F16K 31/02* (2006.01)
*H01F 7/08* (2006.01)
*F16K 7/14* (2006.01)
*F16K 31/06* (2006.01)
*H01F 3/14* (2006.01)
*H01F 7/16* (2006.01)

(52) U.S. Cl.
CPC *H01F 7/081* (2013.01); *F16K 7/14* (2013.01); *F16K 31/06* (2013.01); *H01F 3/14* (2013.01); *H01F 7/16* (2013.01)

(58) Field of Classification Search
CPC .............. H01F 7/81; H01F 3/14; H01F 7/16; F16K 31/06; F16K 7/14
USPC ..................... 251/129.15; 335/297
See application file for complete search history.

(56) References Cited

U.S. PATENT DOCUMENTS

| | | | |
|---|---|---|---|
| 5,603,483 A * | 2/1997 | Reuter et al. ............. | 251/129.02 |
| 5,687,468 A * | 11/1997 | Hans et al. ................. | 29/602.1 |
| 6,201,461 B1 * | 3/2001 | Eichendorf et al. ......... | 335/256 |
| 7,040,594 B2 * | 5/2006 | Hironaka .................... | 251/50 |
| 7,588,229 B2 * | 9/2009 | Eiser et al. ............... | 251/129.02 |
| 2006/0163512 A1 * | 7/2006 | Ogawa ..................... | 251/129.15 |
| 2008/0308758 A1 * | 12/2008 | Fukano et al. ............. | 251/129.15 |
| 2008/0308760 A1 * | 12/2008 | Matsumoto et al. ........ | 251/129.15 |
| 2009/0096282 A1 * | 4/2009 | Lee et al. .................. | 303/119.2 |

* cited by examiner

*Primary Examiner* — John K Fristoe, Jr.
*Assistant Examiner* — Umashankar Venkatesan
(74) *Attorney, Agent, or Firm* — McGuireWoods, LLP

(57) ABSTRACT

A magnetic core (106) is adapted for a solenoid valve (100). The magnetic core (106) includes a base (113), a stem (112), and an inner cavity (115). The inner cavity (115) is formed in a portion of the base (113) and in a portion of the stem (112). The inner cavity (115) defines a thin wall (108) of the stem (112). The magnetic core (106) further comprises a non-magnetic pressure retaining sleeve (420). The non-magnetic pressure retaining sleeve (420) is arranged in such a way that either the non-magnetic pressure retaining sleeve surrounds at least a portion of the thin wall of the stem or that at least a portion of the thin wall portion surrounds the non-magnetic pressure retaining sleeve.

8 Claims, 7 Drawing Sheets

PRESSURE RETAINING SLEEVE

TECHNICAL FIELD

The present invention relates to a magnetic core adapted for a solenoid valve, and more particularly, to a magnetic core with a non-magnetic pressure retaining sleeve.

BACKGROUND OF THE INVENTION

A solenoid valve is an electromechanical valve that operates by controlling an electric current that flows through a solenoid. While solenoid valves exist in many different configurations, one particular configuration includes a movable metallic plunger and a co-axially mounted stationary metallic core. One end of the plunger can contact a guide spring. A valve seat can be attached to the plunger with the guide spring in between. Alternatively, the guide spring can act as a valve seat. The other end of the plunger can contact the stationary metallic core or be coupled to the core using a biasing member such as a spring. The biasing member can bias the plunger assembly against the orifice creating a normally closed valve. It is also known in the art to bias the plunger up towards the stationary metallic core, creating a normally open valve.

When a current flows through a coil that surrounds the stationary metallic core a magnetic flux is created. In one particular design of a solenoid valve, the metallic core partially surrounds the plunger and thus, when a current flows through the coil the magnetic flux created pulls up on the plunger.

One problem that has limited the operation of solenoid valves of this design is the limitation on the pressure rating. Typically, the highest area of stress is the internal pressurization in the portion of the magnetic core wall that encases the plunger. For example, in solenoid valves rated to about 1500 psi with internal diameters of approximately ⅜", the valve requires the wall to have a thickness of about 0.017". The wall thickness is designed to be as thin as possible, while still operating safely, in order to reduce the magnetic flux diverted away from the plunger. The thinner that the wall can be designed, the higher the magnetic reluctance of the path through the wall and thus, the smaller the amount of magnetic flux lost. Magnetic flux lost to the core wall reduces the pulling force on the plunger. Therefore, it is desired to keep the amount of magnetic flux lost to the core wall to a minimum.

In the prior art, in order to increase the pressure rating of the solenoid valve, the wall thickness of the core was increased. For example, to achieve a 4500 psi rating, the prior art wall could be increased to approximately 0.055" for the same internal diameter and wall material. This increase in wall thickness reduced the magnetic reluctance of the wall and consequently, a significant portion of the flux flowed through the wall, thereby decreasing the pull on the plunger. While this was an undesired side-effect, the prior art wall thickness was required to be increased in order to satisfy higher pressure ratings.

The present invention overcomes this and other problems and an advance in the art is achieved.

SUMMARY OF THE INVENTION

A magnetic core adapted for a solenoid is provided according to an embodiment of the invention. The magnetic core includes a base, a stem, and an inner cavity. The inner cavity is formed in a portion of the base and in a portion of the stem, wherein the inner cavity defines a thin wall of the stem. The magnetic core further comprises a non-magnetic pressure retaining sleeve surrounding at least a portion of the thin wall of the stem.

A magnetic core adapted for a solenoid is provided according to an embodiment of the invention. The magnetic core includes a base, a stem, and an inner cavity. The inner cavity is formed in a portion of the base and in a portion of the stem, wherein the inner cavity defines a thin wall of the stem. The magnetic core further comprises a non-magnetic pressure retaining sleeve positioned within the inner cavity and within the thin wall, at least a portion of the thin wall surrounds the non-magnetic pressure retaining sleeve.

A method for increasing a pressure capacity of a magnetic core adapted for a solenoid valve is provided according to an embodiment of the invention. The method comprises the step of providing a magnetic core. The magnetic core includes a base, a stem, and an inner cavity. The inner cavity is formed in a portion of the base and in a portion of the stem, wherein the inner cavity defines a thin wall of the stem. The method further comprises the step of reinforcing the thin wall of the magnetic core with a non-magnetic pressure retaining sleeve.

ASPECTS

According to one embodiment of the invention, the non-magnetic pressure retaining sleeve increases a pressure capacity of the thin wall without substantially affecting a magnetic reluctance of the thin wall.

According to another embodiment of the invention, an inner circumference of the non-magnetic pressure retaining sleeve supports the thin wall.

According to yet another embodiment of the invention, the non-magnetic pressure retaining sleeve further includes an outer circumference sized and shaped to fit within a coil assembly mounted over the magnetic core.

According to yet another embodiment of the invention, the non-magnetic pressure retaining sleeve surrounds the full portion of the thin wall.

According to yet another embodiment of the invention, the non-magnetic pressure retaining sleeve surrounds the full portion of the thin wall and extends along the stem beyond the thin wall.

According to yet another embodiment of the invention, the non-magnetic pressure retaining sleeve comprises an outer circumference affixed to the inside of the thin wall.

According to yet another embodiment of the invention, the non-magnetic pressure retaining sleeve further includes an inner circumference sized and shaped to accept a plunger.

According to yet another embodiment of the invention, the full portion of the thin wall surrounds the non-magnetic pressure retaining sleeve.

According to yet another embodiment of the invention, the full portion of the thin wall surrounds the non-magnetic pressure retaining sleeve and the non-magnetic pressure retaining sleeve extends within the inner cavity beyond the thin wall.

According to one embodiment of the method, the method further comprises the step of positioning the non-magnetic pressure retaining sleeve around at least a portion of the thin wall of the magnetic core.

According to another embodiment of the method, the method further comprises the step of supporting an outer surface of the thin wall with an inner circumference of the non-magnetic pressure retaining sleeve.

According to yet another embodiment of the method, the method further comprises the step of positioning the non-magnetic pressure retaining sleeve around the full portion of the thin wall.

According to yet another embodiment of the method, the method further comprises the step of positioning the non-magnetic pressure retaining sleeve within the inner cavity and within the thin wall such that at least a portion of the thin wall surrounds the non-magnetic pressure retaining sleeve.

According to yet another embodiment of the method, the method further comprises the step of affixing the outer circumference of the non-magnetic pressure retaining sleeve to an inner surface of the thin wall.

According to yet another embodiment of the method, the method further comprises the step of positioning the non-magnetic pressure retaining sleeve within the inner cavity and within the thin wall such that the full portion of the thin wall surrounds the non-magnetic pressure retaining sleeve.

According to yet another embodiment of the method, the non-magnetic pressure retaining sleeve comprises an inner circumference sized and shaped to accept a plunger.

According to an embodiment of the invention, reinforcing the magnetic core with the non-magnetic pressure retaining sleeve increases the pressure capacity of the thin wall, without substantially affecting the magnetic reluctance of the thin wall.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
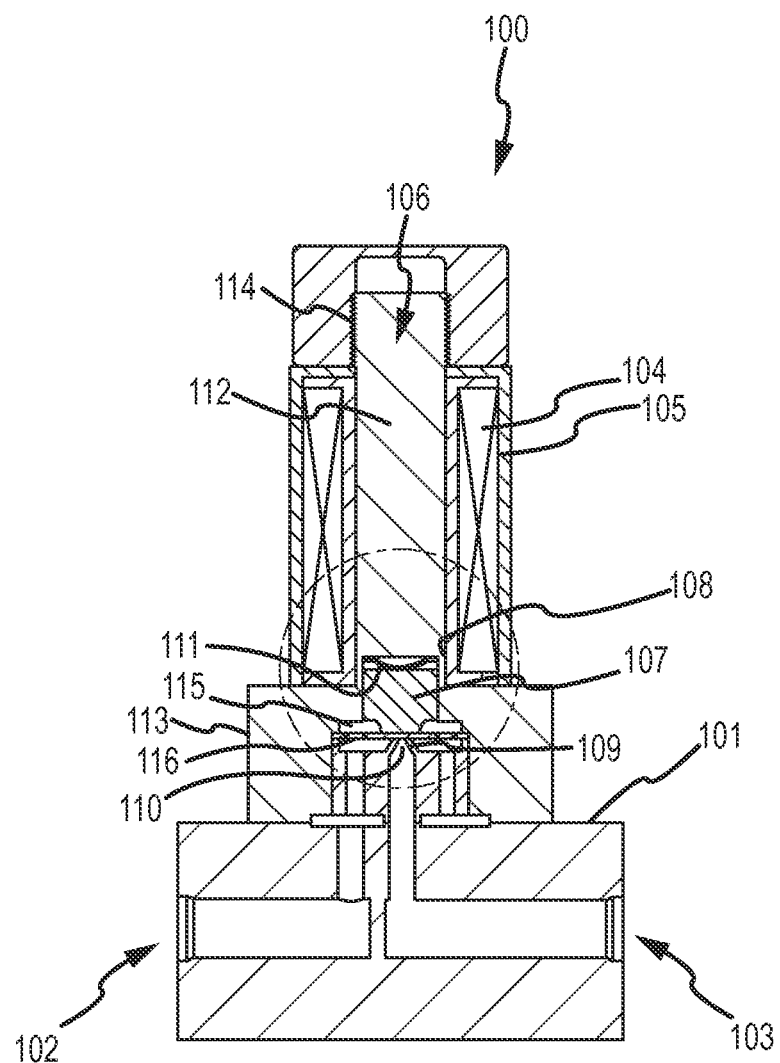
FIG. 1 shows a cross sectional view of a solenoid valve with a magnetic core according to an embodiment of the invention.

FIG. 1 shows a solenoid valve 100 according to an embodiment of the invention. The solenoid valve 100 includes a base 101, a fluid inlet 102, a fluid outlet 103, a coil assembly 104, a coil housing 105, a magnetic core 106, a magnetic plunger 107, and a plunger biasing member 111.

The solenoid valve 100 operates by an electric current flowing through the coil assembly 104. The electric current can be controlled to open and close the valve 100. The magnetic core 106 is provided to channel the magnetic flux that is provided by the coil 104. The magnetic core 106 is positioned such that the magnetic flux overcomes the force provided by the plunger biasing member 111 and pulls the plunger 107 along with a guide spring 116 away from the orifice 109, thus unblocking the orifice hole 110 to allow fluid to flow from the inlet 102 to the outlet 103. It should be understood that the fluid flowing through the valve 100 can be either a gas or a liquid and the particular fluid flowing through the valve 100 should not limit the scope of the invention.

According to the embodiment shown, the magnetic core 106 comprises a single component. However, according to other embodiments, the magnetic core 106 may comprise a number of components positioned together such that a magnetic flux can flow through the magnetic core assembly. In the embodiment shown, the magnetic core 106 comprises a stem 112 extending from a base 113. The magnetic core stem 112 can be substantially surrounded by the coil assembly 104 and coil housing 105. According to one embodiment of the invention, the coil housing 105 is held in place using threads 114, which are provided on the inner surface of the coil housing 105 near the top and are also provided at the top of the magnetic core stem 112. However, it should be understood that the coil housing 105 can be retained in a variety of ways including, but not limited to brazing, bonding, adhesives, friction, etc. The particular method of retaining the coil assembly 104 is not important for the present invention and thus, should not limit the scope of the invention.

According to an embodiment of the invention, the magnetic core 106 also includes an inner cavity 115 within the base 113. According to one embodiment of the invention, the inner cavity 115 extends into a portion of the magnetic stem 112. As shown in FIG. 1, the magnetic core inner cavity 115 substantially surrounds the plunger 107, with the bottom of the plunger 107 contacting the guide spring 116.

In the embodiment shown, the inner cavity 115 extends into a portion of the stem 112. As shown in FIG. 1 and seen better in FIG. 2, there is a thin wall 108 of the magnetic core 106 that is created between the inner cavity 115 and the magnetic core stem 112. When the valve 100 is pressurized, this thin wall 108 is typically where stress is most prevalent. Because the thin wall 108 is typically the weakest point of the magnetic core 106, it usually determines the maximum pressure rating of the valve 100. For example, if the pressure rating of the solenoid valve 100 is approximately 1500 psi, with an internal diameter of ⅜ inch, the thin wall 108 may have a thickness of between about 0.014 inches and about 0.020 inches. According to one embodiment of the invention, the wall 108 would have a thickness of about 0.017". The precise thickness of the wall will vary, depending on the particular material used to form the magnetic core 106, as well as the desired pressure rating. The above mentioned dimensions are used strictly for example and therefore, the thickness of the wall 108 should not limit the scope of the invention as the invention can be implemented under a wide variety of pressure ratings as well as using a number of different magnetic materials.

According to an embodiment of the invention, the wall 108 is manufactured to be as thin as possible for the desired pressure rating, while still operating under safe conditions. For example, with a pressure rating of about 1500 psi, if a wall thickness of about 0.017" is chosen, the wall has a relatively high reluctance. The exact reluctance is dependent on a number of factors, including the material used for the magnetic core 106 and therefore, precise values are not discussed, as these will vary. A high magnetic reluctance is desired because the higher the reluctance of the wall 108, the less loss in the wall 108, and the greater the resulting pulling force provided on the plunger 107. This is because a relatively small amount of the magnetic flux will flow through the wall 108 instead of the plunger 107. This is why a thinner wall 108 with a relatively high reluctance is desired.

Figure 2:
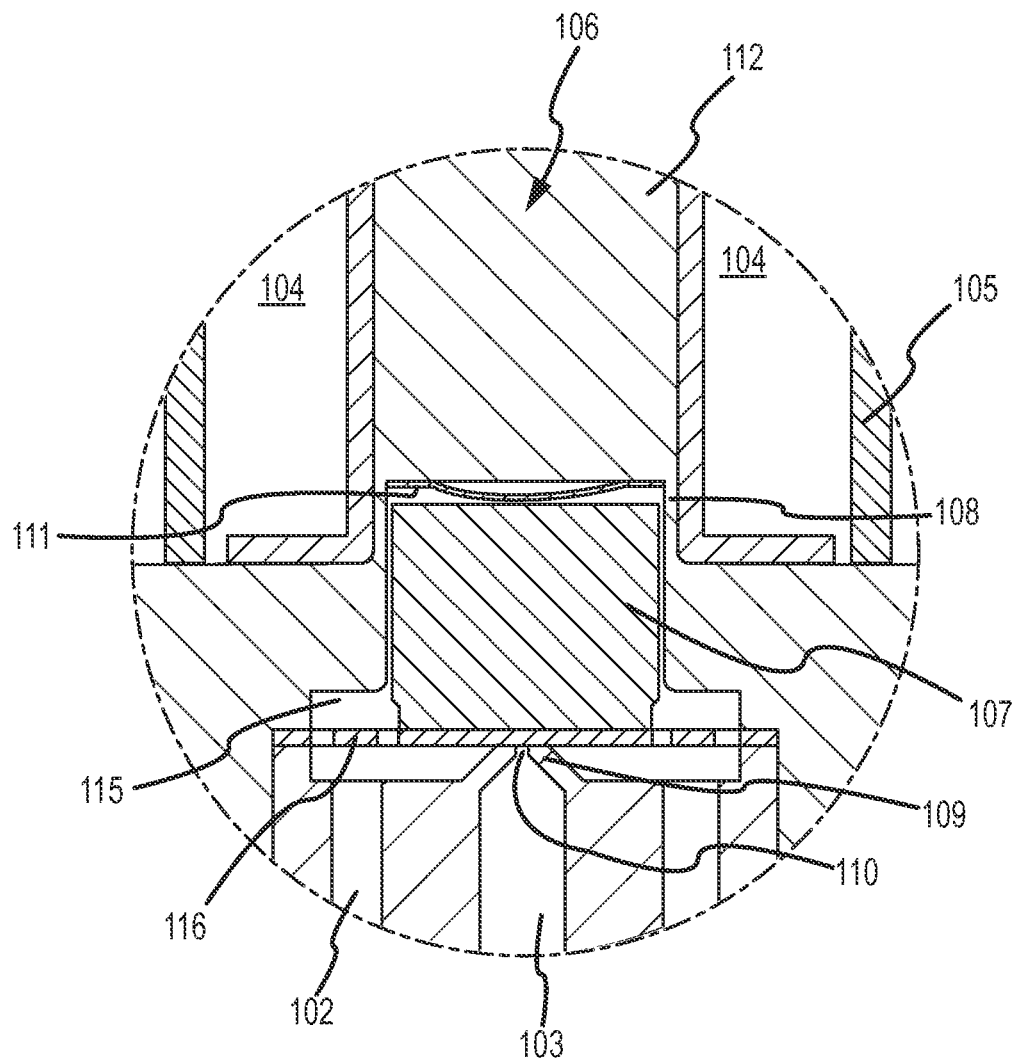
FIG. 2 shows the magnetic core according to an embodiment of the invention.

FIG. 2 shows the plunger 107 and wall 108 in greater detail according to an embodiment of the invention. As is seen better, the plunger 107 in this embodiment is biased against the orifice 109 by the biasing member 111. When a magnetic flux acts upon the plunger 107, the plunger 107 lifts away from the orifice 109, thus exposing the orifice hole 110. When the orifice hole 110 is exposed, fluid from the inlet 102 can communicate with the outlet 103.

As shown in FIG. 2, the valve 100 includes a relatively thin wall 108. Advantageously, the wall 108 diverts only a small amount of the flux away from the plunger 107. However, the wall 108 is susceptible to being damaged under high pressure environments. As can be seen, the fluid can flow into the inner cavity 115 of the magnetic core 106, thus exposing the thin wall 108 to the pressure of the fluid. Also, FIG. 2 shows that because the thin wall 108 is the weakest portion of the magnetic core 106, it is the limiting portion for pressure failure. Therefore, in the past, if a higher pressure rating was needed, the manufacturer was required to produce a magnetic core 106 with a thicker wall 108. This is shown in FIG. 3.

Figure 3:
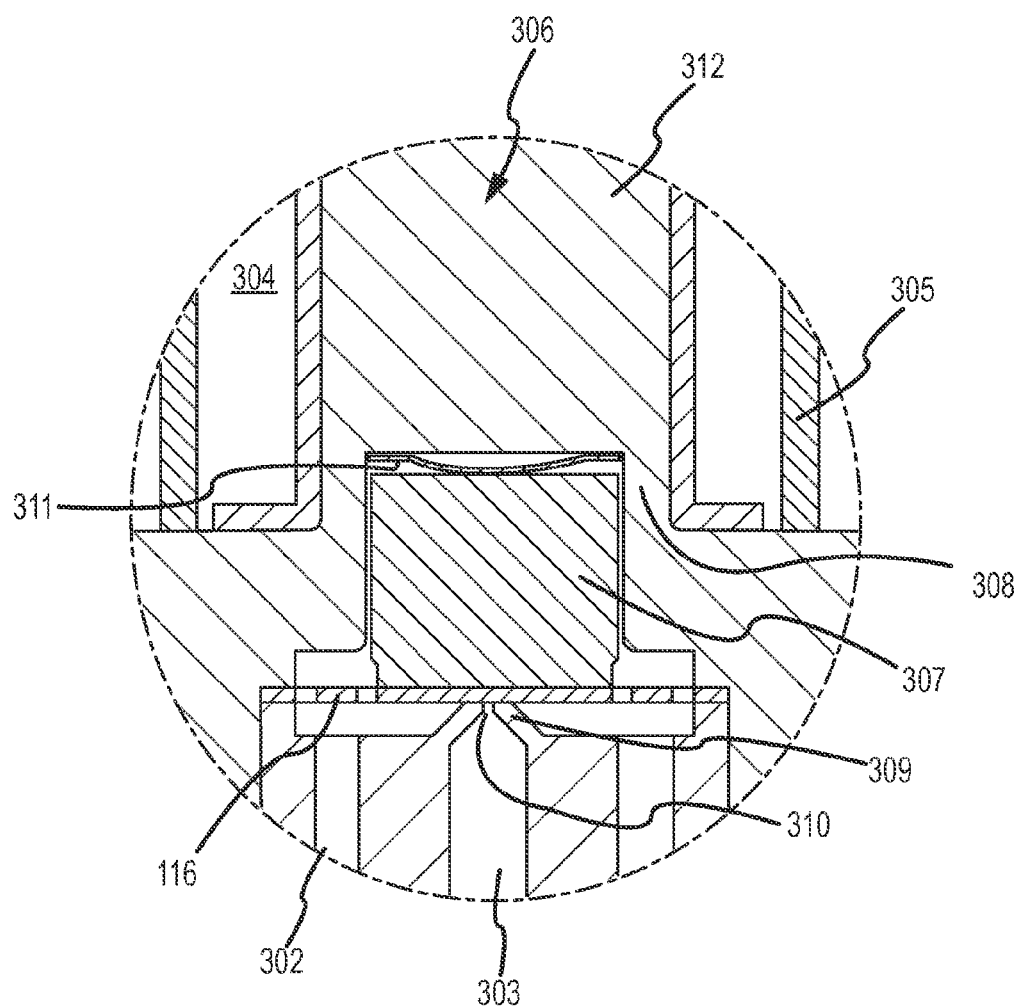
FIG. 3 shows a prior art magnetic core.

FIG. 3 shows a prior art valve 300. The prior art valve 300 has been modified from the valve 100 with respect to the magnetic core 106 and specifically the wall 308. As can be seen by a comparison between the valve 100 and the valve 300, the wall 308 is substantially thicker than the wall 108 in order to handle increased pressure demands. The actual thickness of the wall 308 was determined by the specific pressure rating desired, and the increase in the thickness may not be to scale, but is exaggerated for the purpose of clarity.

While the additional thickness in the wall 308 does allow for increased internal pressure, it also diverts a greater amount of the flux away from the plunger 307. This is because the thicker wall 308 has a reduced reluctance as compared to the wall 108 and thus, the flux more easily flows through the wall 308 than through the wall 108. The result is a decrease in the pulling force acting on the plunger 307. This decrease in the pulling force can undesirably affect the function of the valve 300. However, in the past, this increase was necessary for increasing the pressure rating of the solenoid valve.

Not only does this approach result in a decrease in the pulling force of the valve, but also increases the cost because to increase the pressure rating a manufacturer is required to produce a different, and more expensive, magnetic core 306. Furthermore, this prior art approach typically employs a different valve for different pressure ranges in order to maximize the pulling force acting on the plunger 107 a separate valve needed to be used for different internal pressures. Typically, the same valve would not be used for different pressures because of the undesired affect that increasing the thickness of the wall 108 has on the pulling force acting on the plunger 107.

Figure 4:
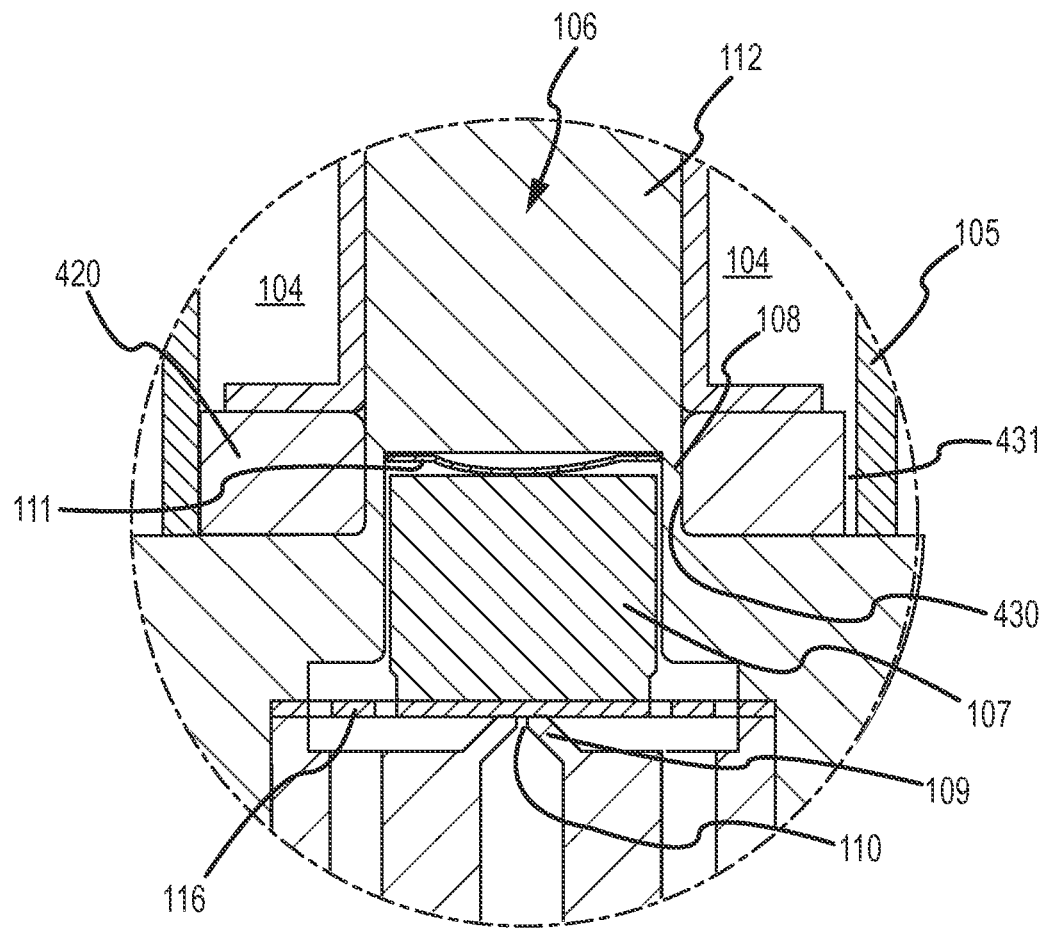
FIG. 4 shows the magnetic core with a pressure retaining sleeve according to an embodiment of the invention.

FIG. 4 shows the solenoid valve 100 with a non-magnetic pressure retaining sleeve 420 according to an embodiment of the invention. It should be understood that the term "non-magnetic" should not limit the invention to sleeves that are completely non-magnetic, but should include sleeves that possess magnetic properties, but are less magnetic than the remaining magnetic components of the solenoid valve 100. The non-magnetic pressure retaining sleeve 420, hereinafter sleeve 420, is advantageously positioned around the thin wall 108 of the magnetic core 106. The sleeve 420 includes an inner circumference 430 and an outer circumference 431. According to an embodiment of the invention, the inner circumference 430 is adapted to accept the magnetic core stem 112. Specifically, the inner circumference 430 is adapted to accept and substantially surround the wall 108.

According to an embodiment of the invention, the sleeve 420 may be press or friction fit over the wall 108. However, it should be understood that the sleeve 420 may be affixed to the magnetic core 106 in a variety of ways including, but not limited to, brazing, bonding, adhesives, etc. However, it is preferred that the sleeve 420 be coupled to the magnetic core 106, and specifically to the wall 108, in such a manner that the sleeve 420 can provide additional support for increased pressures. In other words, the non-magnetic pressure retaining sleeve increases the pressure capacity of the thin wall 108. While FIG. 4 shows an embodiment with the sleeve 420 positioned over the whole portion of the thin wall, it should be understood that according to some embodiments, the sleeve 420 only surrounds a portion of the thin wall 108. According to other embodiments, the sleeve 420 surrounds the thin wall 108 and extends up the stem 112 beyond the thin wall 108.

According to an embodiment of the invention, the sleeve 420 also includes an outer circumference 431. The outer circumference 431 is optimally sized so the coil housing 105 can be assembled over the outer circumference 431. In this manner, the coil housing 105 can protect the sleeve 420 from damage. Additionally, with the coil housing 105 surrounding the sleeve 420, the magnetic flux can flow around the outside of the sleeve 420.

The solenoid valve 100 shown in FIG. 4, comprises the same magnetic core 106 as provided in FIG. 1, however, with the sleeve 420 in place, the valve 100 can withstand much higher pressures. The non-magnetic pressure retaining sleeve 420 substantially surrounds the wall 108 and increases the pressure capacity of the thin wall 108. However, because the sleeve 420 is non-magnetic, there is not an increase in the flux diverted away from the plunger 107 as realized with the prior art approach of increasing the wall 108 thickness.

Figure 5:
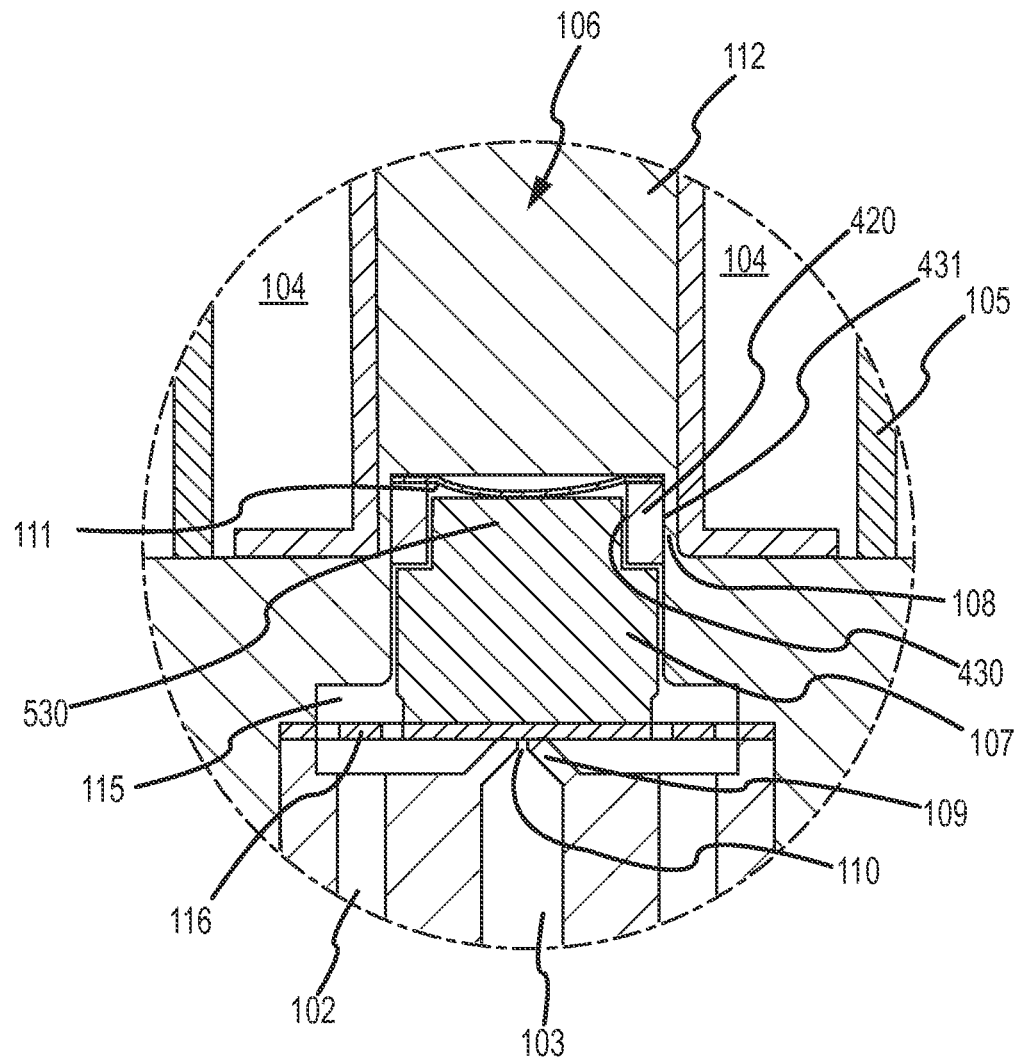
FIG. 5 shows the magnetic core with a pressure retaining sleeve according to another embodiment of the invention.

FIG. 5 shows the magnetic core 106 according to another embodiment of the invention. According to this embodiment, the non-magnetic pressure retaining sleeve 420 is positioned within the inner cavity 115 and more specifically, within the thin wall 108. In this embodiment, the sleeve 420 has an outer circumference that is sized and shaped to fit within the thin wall 108. The sleeve 420 may be affixed to the inner surface of the thin wall in any sufficient manner including, but not limited to, bonding, adhesives, press or friction fit, etc. However, the manner chosen to affix the sleeve 420 to the inner surface of the thin wall should be in such a way that the process fluid cannot go between the sleeve 420 and the thin wall 108. The sleeve 420 may be surrounded by a portion or the full portion of the thin wall 108. In other embodiments, the sleeve 420 may be surrounded by the thin wall 108 and extend along the interior of the inner cavity beyond the thin wall 108.

According to the embodiment shown in FIG. 5, the sleeve 420 also includes an inner circumference 430 that is sized and shaped to accept a portion of the plunger 107. In this manner, the insertion of the sleeve 420 does not inhibit the movement of the plunger 107. Although, it can be seen from the figure that the plunger 107 may be provided with a thinner area 530, which is smaller than the rest of the plunger 107 in order to easily move within the sleeve 420.

It should be appreciated that the embodiment shown in FIG. 5 with the sleeve 420 on the inside of the thin wall 108 realizes the same advantages as providing the sleeve 420 on the outside of the thin wall 108. In both embodiments, the sleeve 420 increases the pressure capacity of the thin wall 108 and thereby increases the versatility of the magnetic core 106 and the solenoid in which the magnetic core 106 is installed.

Figures 6A, 6B:
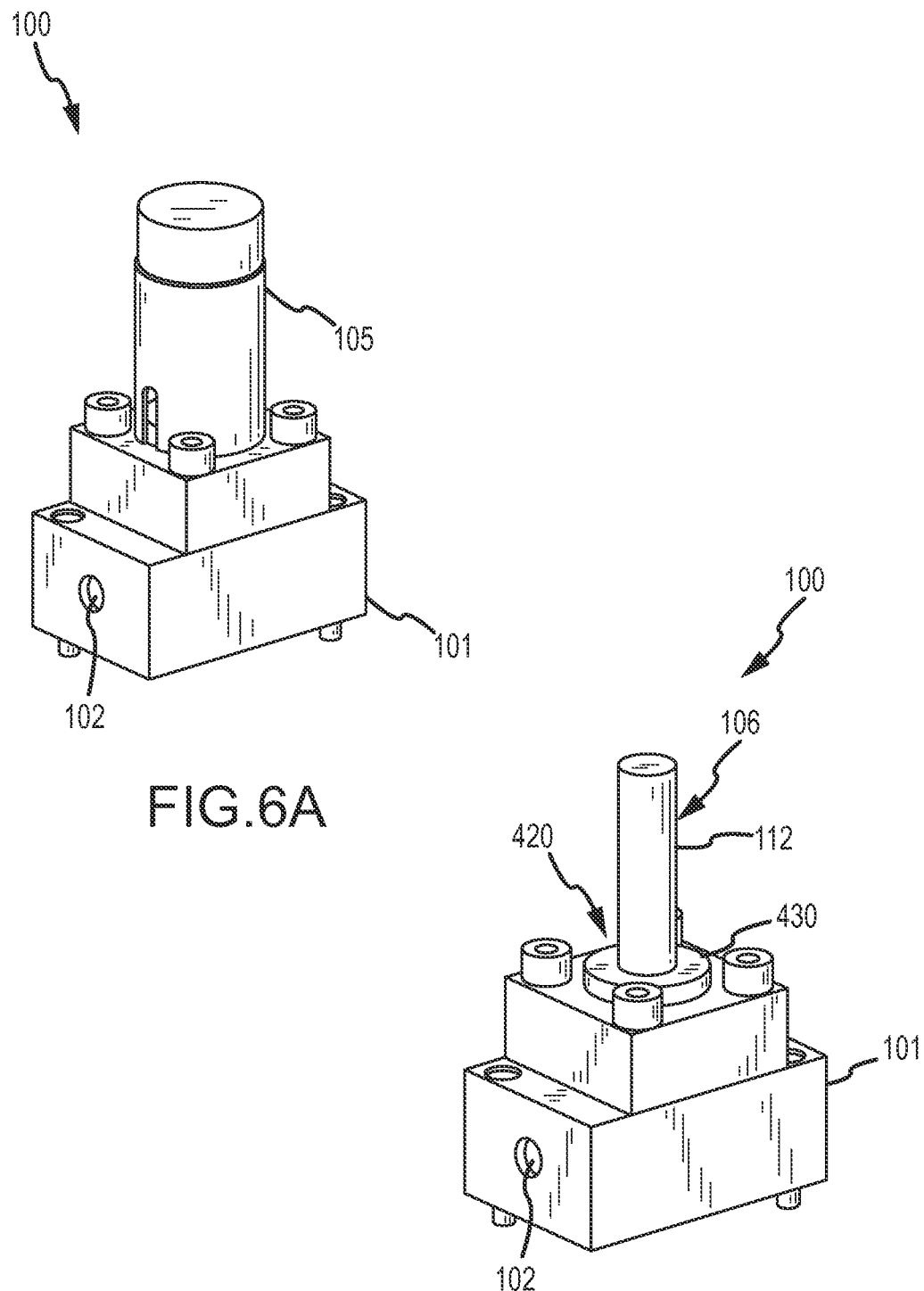
FIG. 6A shows the solenoid valve with the coil housing according to an embodiment of the invention.
FIG. 6B shows the solenoid valve with the coil housing removed and with the pressure retaining sleeve according to an embodiment of the invention.

FIG. 6A shows a perspective view of the solenoid valve 100. In the embodiment shown, the coil housing 105 comprises a substantially circular cylinder. The coil housing 105 can advantageously fit over and enclose the sleeve 420. It should be understood that the coil housing does not have to comprise a substantially circular cylinder and the shape may be configured to accommodate a customer's specifications.

FIG. 6B shows the solenoid valve 100 with the coil housing 105 removed. In this figure, the sleeve 420 can be seen on the magnetic core stem 112. The inner circumference 430 is substantially the same size and shape as the magnetic core 112. As mentioned above, the non-magnetic pressure retaining sleeve 420 can be attached to the magnetic core 112 in a variety of ways and when provided can increase the pressure rating of the solenoid valve 100 by providing additional support for the wall 108 against damage caused by internal pressure. As mentioned above, while the magnetic core stem 112 is shown in FIG. 6B as comprising a circular shape, the precise shape should not limit the scope of the invention. The non-magnetic pressure retaining sleeve 420 can be formed to accommodate the shape of the magnetic core stem 112 and thus, should not be limited to circular designs.

The non-magnetic pressure retaining sleeve 420 provides a number of advantages over the prior art. The sleeve 420 can advantageously be provided to increase the pressure rating of the solenoid valve 100 by adding to the thickness of the wall 108. Additionally, the sleeve 420 does not divert the flux away from the plunger 107 because it is substantially non-magnetic. Furthermore, the sleeve 420 may be incorporated into the magnetic core 106 during manufacturing. Advantageously, the same magnetic core 106 can be used for a much greater range of pressures. Unlike in the prior art, the magnetic core 106 does not need to be exchanged for a magnetic core 106 with a thicker wall 108 when an increased internal pressure is desired. It should be appreciated, that the non-magnetic pressure retaining sleeve 420 advantageously increases the variation under which the solenoid valve 100 can operate.

It should be understood that while the above examples illustrate the non-magnetic pressure retaining sleeve 420 as only surrounding a portion of the magnetic valve stem 112, it should be understood that in other embodiments the non-magnetic pressure retaining sleeve 420 can surround substantially the entire magnetic valve stem 112.

Figure 7:
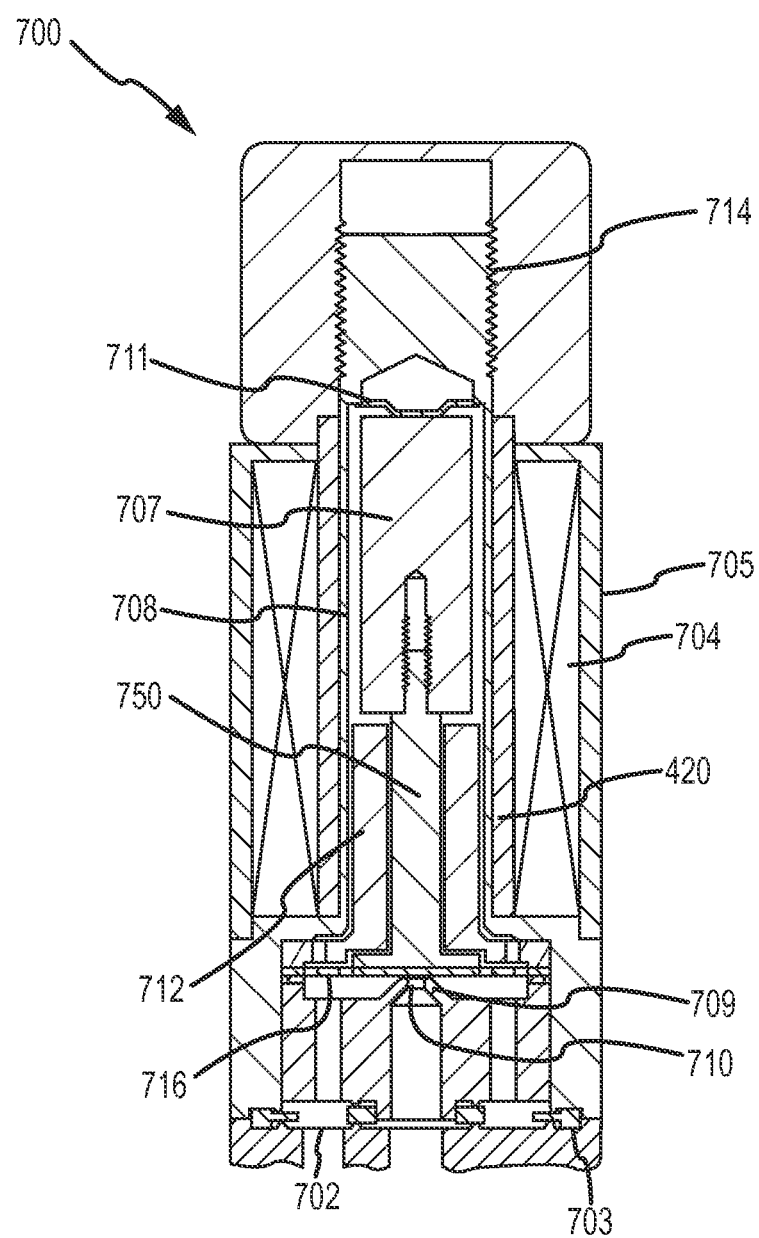
FIG. 7 shows the solenoid valve according to another embodiment of the invention.

FIG. 7 shows a solenoid valve 700 according to an embodiment of the invention. In the embodiment shown, the plunger assembly 707 is configured to be normally open. That is, the guide spring 716 is pulled away from the orifice 709 in the absence of a magnetic force. The solenoid valve 700 operates in much the same way as the solenoid valve 100. However, as can be seen, the plunger 707 also includes a plunger extension 750. The plunger extension 750 couples the plunger 707 to the guide spring 716. Additionally, when electric current flows through the coil 704, the magnetic stem 712 directs the current to pull down on the plunger 707 and plunger extension 750, thus contacting the guide spring 716 to the orifice 709 and closing the orifice hole 710.

The other main difference between the solenoid valve 700 and the solenoid valve 100 is that the non-magnetic pressure retaining sleeve 420 extends much further in the solenoid valve 700 than in the solenoid valve 100. As can be seen, the non-magnetic pressure retaining sleeve 420 extends substantially along the entire length of the coil assembly 704. This is because the plunger 707 extends through substantially the entire coil assembly 704, and thus, the thin wall portion 708 is much longer. Thus, the sleeve 420 extends further in order to substantially surround the entire thin wall portion 708.

It should be understood, that while reference is made to FIG. 7 when discussing embodiments including the sleeve 420 extending substantially along the entire coil assembly. It should be understood that the sleeve 420 in some embodiments does extend along substantially the entire stem 112.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other solenoid valves, and not just to the embodiments described above and shown in the accompanying figures. Accordingly, the scope of the invention should be determined from the following claims.

I claim:

1. A solenoid valve, comprising: a magnetic core having a base portion and a stem portion; wherein the base portion has a greater width than the stem portion; a coil assembly; a coil housing that houses the coil assembly; an inner cavity formed in a portion of the base and in a portion of the stem, wherein the inner cavity defines a thin wall of the stem; and a non-magnetic pressure retaining sleeve located within the coil housing and surrounding at least a portion of the thin wall of the stem, wherein said non-magnetic pressure retaining sleeve includes an inner circumference and an outer circumference, said inner circumference of said non-magnetic pressure retaining sleeve is adapted to accept the stem and surround the thin wall, the outer circumference of said non-magnetic pressure retaining sleeve is sized to abut an inner circumference of said coil housing, said non-magnetic pressure retaining sleeve includes a bottom surface that abuts said base, and said non-magnetic pressure retaining sleeve includes a top surface that abuts a bottom surface of the coil assembly.

2. The solenoid valve of claim 1, wherein the non-magnetic pressure retaining sleeve increases a pressure capacity of the thin wall, without substantially affecting a magnetic reluctance of the thin wall.

3. The solenoid valve of claim 1, wherein the non-magnetic pressure retaining sleeve surrounds a full portion of the thin wall.

4. The solenoid valve of claim 1, wherein the non-magnetic pressure retaining sleeve surrounds a full portion of the thin wall and extends along the stem beyond the thin wall.

5. A magnetic core adapted for a solenoid valve, comprising: the magnetic core having a base portion and a stem portion; wherein the base portion has a greater width than the stem portion; a plunger comprising a plunger bottom portion and a plunger top portion, wherein the plunger bottom portion has a greater width than the plunger top portion; the plunger is fully enclosed in the base portion of the magnetic core; an inner cavity formed in a portion of the base and a portion of the stem, wherein the inner cavity defines a thin wall of the stem; a non-magnetic pressure retaining sleeve positioned completely within the inner cavity and within the thin wall, wherein a full portion of the thin wall surrounds the non-magnetic pressure retaining sleeve, and wherein the non-magnetic pressure retaining sleeve is positioned around the entire plunger top portion; and a plunger biasing member positioned within the inner cavity and wherein at least a portion of the plunger biasing member directly contacts a top surface of the non-magnetic pressure retaining sleeve within the inner cavity.

6. The magnetic core of claim 5, wherein the non-magnetic pressure retaining sleeve increases a pressure capacity of the thin wall, without substantially affecting a magnetic reluctance of the thin wall.

7. The magnetic core of claim 5, wherein the non-magnetic pressure retaining sleeve comprises an outer circumference affixed to the inside of the thin wall.

8. The magnetic core of claim 5, wherein the non-magnetic pressure retaining sleeve further includes an inner circumference sized and shaped to accept a plunger.

* * * * *